United States Patent

Thorigne et al.

[19]

[11] Patent Number: 5,841,123
[45] Date of Patent: Nov. 24, 1998

[54] PASSIVE CARD WITHOUT CONTACT

[75] Inventors: Yves Thorigne, Verson; Jacky Bouvier, Meylan, both of France

[73] Assignees: France Telecom, Paris; La Poste, Boulogne Billancourt, both of France

[21] Appl. No.: 667,127

[22] Filed: Jun. 20, 1996

[30] Foreign Application Priority Data

Jun. 22, 1995 [FR] France .................................. 95 07514

[51] Int. Cl.$^6$ .............................................. G06K 19/077
[52] U.S. Cl. ......................................... 235/492; 235/487
[58] Field of Search ..................................... 235/487, 492

[56] References Cited

FOREIGN PATENT DOCUMENTS

| A-0 525 642 | 2/1993 | European Pat. Off. . |
| WO-A-9208209 | 5/1992 | WIPO . |
| WO-A-9315417 | 8/1993 | WIPO . |

OTHER PUBLICATIONS

Darwish, Choisir SA Technologie Pour Un Asic Mixte, Electronique No. 25, 1993, pp. 49–51.
Jurish, Identifikation: Kontaktlos Via Hochfrequenz, Electronik vol. 42, No. 9, 1993, p. 90.

*Primary Examiner*—F. L. Evans
*Attorney, Agent, or Firm*—Law Offices Pollock, Vande Sande & Priddy

[57] ABSTRACT

A component comprises a coil for the supply by induction of the component and for the inductive bidirectional transfer with the station of a signal representative of data. Means for processing said signal are supplied by the coil and are produced in integrated technology on the substrate of the component. The turns of the coil are produced in flat integrated technology by metallization on the surface of the component. The integral coil occupies at least 50% of the total surface of the component.

15 Claims, 6 Drawing Sheets

PASSIVE CARD WITHOUT CONTACT

BACKGROUND OF THE INVENTION

1. Field of the Invention

The present invention relates to a micro-electronic component for a passive card without contact, a passive card without contact carrying such a component, a station intended to be electromagnetically coupled to such a passive card without contact and a production process for the micro-electronic component.

The present invention has general application in the uni- or bi-directional transfer of data between a passive card without contact and a remote station.

2. Description of the Related Art

In general, a card without contact either contains or does not contain an internal energy source. In the first case, it is an active card, whereas in the second case it is a passive card.

A passive card without contact either receives the energy it requires by electromagnetic coupling from the remote station. It is known as a proximity card if its operating distance from the station is generally less than or equal to a few millimeters.

In practice, a passive card without contact carries a micro-electronic component comprising a coil (also known as an antenna or self-inductor) for supplying power to the component by induction and for inductive transfer with the station of a signal representing data, and processing means supplied by the coil and able to process the signal thus transferred or to be transferred.

From a technological point of view, there are two separate categories of passive cards without contact.

In the first category, the electromagnetic coupling is provided by an antenna (or several), formed on a substrate different from that of the micro-electronic component. More precisely, the antenna is engraved on a selected substrate itself placed in the constituent material of the card (PVC, ABS, polycarbonate etc). The micro-electronic component is itself attached to the antenna by soldered wires. This first category is referred to below as a passive card without contact with assembled coil. The production process for this card is complex because of the operations required for assembly by wire.

In the second category, the coil is engraved directly on the micro-electronic component, usually a silicon material. This second category is referred to below as a passive card without contact with integral coil, or "coil on chip". The production process for this integral card is considerably simplified in relation to that of the assembled card as various assembly operations are omitted, in particular connection of the micro-electric component to the antenna.

However, the surface of an integral coil is generally smaller than that of an assembled antenna in so far as the surface of the integral coil is limited by the surface of the component, which is preferably as small as possible to reduce production costs, and by the area necessarily occupied by the processing means of the component, which limits the energy transmitted to the passive card without contact.

Also the three-dimensional configuration of the conductive turns of an integral coil brings about a number of difficulties, in particular the creation of parasitic components, for example, the formation of a capacitor, the capacitance of which may be not insignificant, which leads to a reduction in the electrical power available on said component.

The article ELECTRONIQUE No. 25, February 1993, PARIS, pages 49–51 XP 00334566, MOUGAHED DARWISH, "Choisir sa technologie pour un asic mixte", describes an integrated circuit without an internal power supply comprising processing means for processing a signal representative of data to be transferred to a remote station, and an integral coil on silicon in order to supply the energy to the integrated circuit.

Only a small number of windings is made here using a conventional metallisation process for integrated circuits which prevents induction of sufficient energy to supply the processing means ensuring a bidirectional transfer of data.

SUMMARY OF THE INVENTION

The present invention solves the problem of producing a micro-electronic component with integral coil for passive cards without contact allowing the transfer of a high energy sufficient to supply the processing means of the component able to process the bidirectional transfer of data between a card and a station, while avoiding the creation of parasitic components, and with production costs considerably lower than those of a card with contacts or a passive card without contact with assembled coil.

This object is achieved by a micro-electronic component of the integral coil type described above, characterized in that the surface area of the component is of the order of a few square millimeters, the turns of the integral coil cover at least about 50% of the total area of the component, the transfer of data is bidirectional, and the number of turns of the integral coil and their width are selected according to a predetermined law which depends on the yield of the supply by induction in the presence of a magnetic field, the total surface area of the component, the surface area necessary to produce the processing means and the variation in voltage at the terminals of the processing means during the bidirectional transfer of data.

For example, the surface of the component is a square of 8 mm$^2$ and the integral coil is produced on at least one level of metallisation which allows the turns of the integral coil to cover approximately 60% of the total surface area of the component.

In another preferred embodiment of the invention, the integral coil is produced using a micro-electronic technology of 0.5 microns allowing the performance of metallisation of the integral coil on several levels, which allows a corresponding reduction in the surface area of the integral coil and also minimizes the production costs. In this embodiment of the invention, the surface of the component is, for example, a square of 4 mm$^2$ and its integral coil is produced over three layers of metallization, which allows the turns of the coil to cover approximately 87% of the total surface of the component.

In practice, the turns of the integral coil are produced on the periphery of the total surface of the component, around the processing means.

According to another aspect of the invention, the processing means comprise means for rectifying the alternating high frequency signal transferred by induction by the station, in the presence of a magnetic field, into a continuous signal modulated as a function of data transmitted by the station, and means for demodulating the continuous modulated signal thus rectified to recover the data transmitted by the station.

For example, the means for demodulation are of the amplitude demodulation type which allows simplification of the processing means and reduction in the power required for these processing means.

According to another aspect of the invention, the processing means comprise means for modulating the alternating high frequency signal at the terminals of the coil, in the presence of a magnetic field, for the transmission of data from the component to the station.

In practice, the modulation means are of the amplitude modulation type obtained by modulating the load on the supply voltage.

According to an important characteristic of the invention, the processing means also comprise means for recovering a clock signal from an alternating high frequency signal transferred by induction by the remote station, in the presence of a magnetic field, means for memorizing data, timed according to the clock signal thus recovered, and means for reading/writing data to the memory means, timed according to the clock signal thus recovered.

A further object of the present invention is a passive card without contact comprising the components described above.

A further object of the present invention is a station intended to be electromagnetically coupled to such a passive card without contact.

Finally, another object of the present invention is a process of obtaining a micro-electronic component for a passive card without contact, intended to be electromagnetically coupled to a remote station for the transfer of data between the component and the station.

In the known manner, the process comprises the following steps:

a) production in integrated circuit technology on the substrate of the component, of processing means able to process a signal representative of transferred data, the surface area of which is significantly smaller than that of the component, and b) production in flat integrated technology by metallisation and direct engraving on the surface of the component substantially unoccupied by the processing means, of the turns of a coil for the supply by induction of the processing means of the component and for the inductive transfer with the station of the signal representative of data.

According to an essential characteristic of the invention, step b) allows the production of the turns of the integral coil such that they cover at least 50% of the total surface area of the component, which is the order of a few square millimeters, the transfer of data being bidirectional. The process comprises an initial step in which the number of turns of the integral coil and their width are selected according to a predetermined law which is a function of the yield of the supply by induction of the component, the total surface area of the component, the area necessary to produce the processing means, and/or the variation in the voltage at the terminals of the processing means during the bidirectional transfer of data.

According to another aspect of the invention, the coil is produced on at least one metallisation layer, for example on three metallisation layers using a micro-electronic technology of 0.5 microns.

BRIEF DESCRIPTION OF THE DRAWINGS

Other characteristics and advantages of the invention will become clear from the detailed description below and the attached drawings in which.

DETAILED DESCRIPTION OF THE INVENTION

Figure 1:
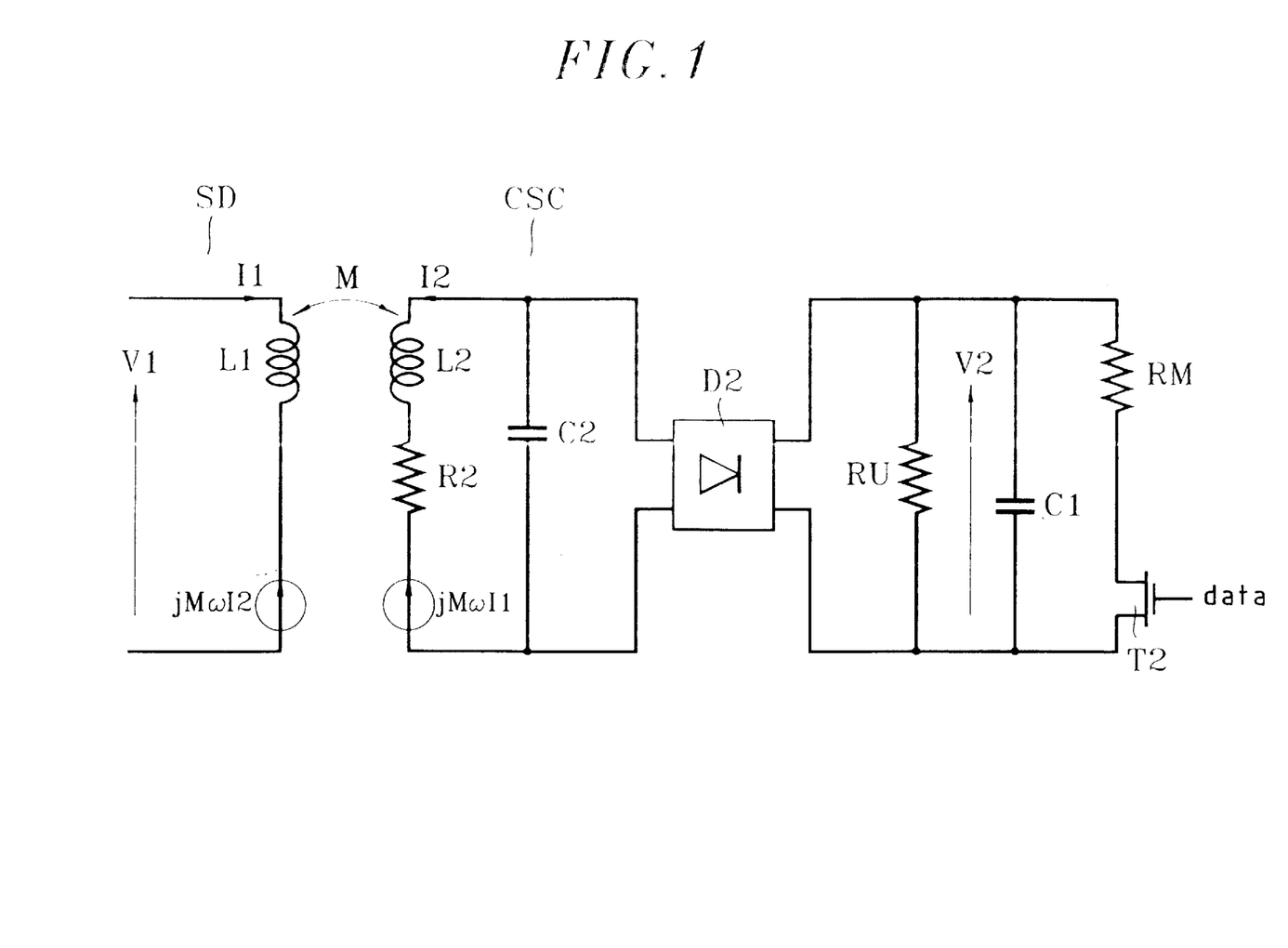
FIG. 1 is a diagrammatic view of the inductive coupling of a remote station and a passive card without contact.

With reference to FIG. 1, the antenna L1 of the remote station SD is coupled electromagnetically to the inductor (or coil) L2 of the passive card without contact CSC. The antenna L1 is produced in the form of a rod or a torus with air gap in magnetic material, on which are wound several turns through which a current I1 passes. The inductor L2 consists of a set of turns engraved in the component of the card as will be described in more detail below. The current I2 passes through the turns of the integral coil L2.

The inductive coupling is defined by the mutual inductance M between the circuits L1 and L2. The coupling is effected by the two voltage generators: $jM\omega I2$ on the station side, supplied at the terminals of antenna L1, and $jM\omega I1$ on the card side, supplying voltage V2 to the terminals of the inductor L2. The card circuit is characterized by the inductance L2, the antenna capacitance C2 and the loss resistance R2. The inductive voltage V2 in the inductor L2 is rectified by a rectifier bridge D2 then filtered by a smoothing capacitor CL.

The resistor RU mounted in parallel with the smoothing capacitor CL here represents the equivalent load resistance, i.e. all electronic circuits of the component of which the consumption would be equal to that of RU.

The resistor RM represents the load modulation resistance which will be described in more detail below.

The transistor T2 is or is not conductive in synchronization with the data sent by the component to the remote station.

As will be seen in more detail below, the numeric values of the component elements are selected according to a predetermined law according to the invention. In practice, resistor RU is of the order of 9 k$\Omega$, the continuous voltage V2 is of the order of 3 V and the power available on the component is of the order of 1 mW.

Figure 2:
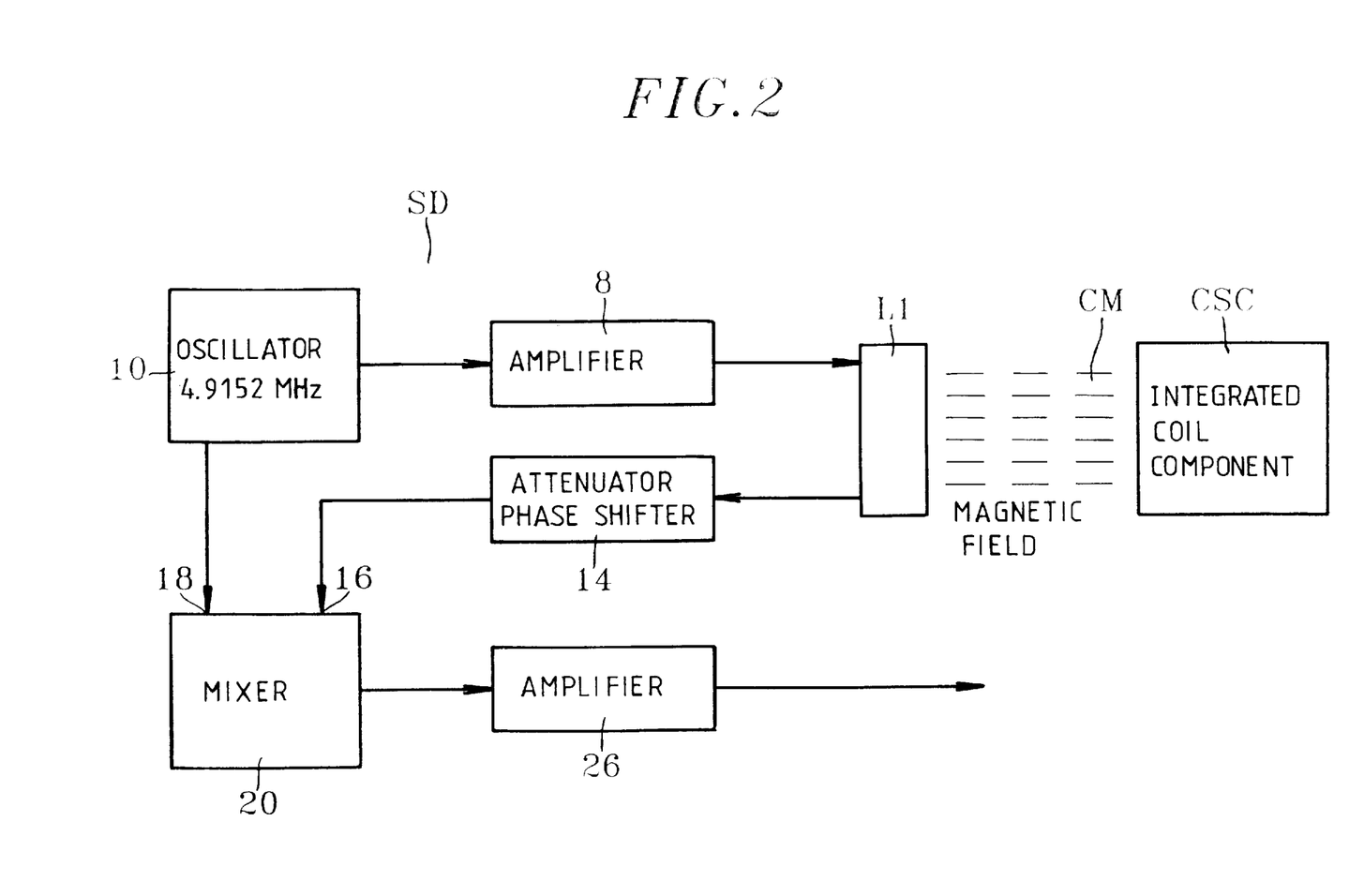
FIG. 2 is a diagram of the essential means of the station intended to be coupled electromagnetically with the component of the card without contact according to the invention.

In FIG. 2, the passive card without contact CSC is electromagnetically coupled to the remote station SD through a magnetic field CM, for example, of the order of 5 Gauss or more. The remote station provides the functions of power supply and exchange of data with the passive card without contact. During operation, the card without contact is spaced by a distance of the order of 2 mm from the solenoid L1 of the station and on its axis.

An oscillator 10 supplies a high frequency alternating signal F1 to the solenoid L1 through amplification means 8.

For example the frequency F1 of the oscillator is 4.9152 MHz.

In practice, solenoid L1 is produced on a mandrel with a magnetic core. It consists of 16 turns of length 9 mm and diameter 9 mm. It should be noted that the high frequency signal F1 allows simultaneous transmission of the energy, the clock and data to component CSC.

An attenuator-phase shifter network 14 is provided to receive the signal transmitted by the card. This attenuator-phase shifter network 14 adapts the input level, close to 120 V peak to peak at the terminals of solenoid L1, to around forty millivolts peak to peak, which corresponds to an attenuation of 70 dB. For example, the attenuator-phase shifter network 14 comprises a capacitive network dividing by 100, then an LRC attenuator and phase shifter network in order to present the signal in phase with the signal from the oscillator 10 at frequency F1, namely 4.9152 MHz.

A mixer 20 comprises an input 16 to receive the signal from the attenuator 14 and an input 18 to receive the signal from the oscillator 10.

The mixer 20 has a conversion gain of the order of 16 dB.

An amplifier 26 is placed at the outlet of mixer 20. This amplifier 26 has a gain of 80 dB and a pass band of 50 kHz. It consists of three cells, the first is a passive RC filter matched in impedance to the mixer output. The following two cells consist of an operational amplifier of 40 dB each with a pass band of 50 kHz. The first operational amplifier is mounted in inverter mode while the second is mounted in non-inverter mode for stability reasons.

Regeneration means (not shown) are connected to the output of the amplifier means to regenerate the data thus restored as binary data.

Referring again to FIG. 1, the transmission of data from the component to the station applies the principle of load modulation. In brief the load present at the supply terminals is changed.

The load resistance varies between RU (transistor not conducting) and RU.RM/RU+RM (transistor conducting).

The excess voltage coefficient of solenoid L1 varies as a function of the power dissipated by the component. Voltage V1 present at the terminals of the solenoid then shows a slight variation. The load modulation at the terminals of L1 is reflected by an amplitude modulation.

An practice, for a modulation resistance equal to 16 kΩ, the modulation index is here of the order of 0.2%.

The data transmission in the direction from component to station is of the order of 9.6 kbits/s.

Also, the sine-wave voltage available at the terminals of inductor L2, with the clock recovery means, allows generation of several clocks necessary for the functioning of the logic circuits of the component.

Figure 3:
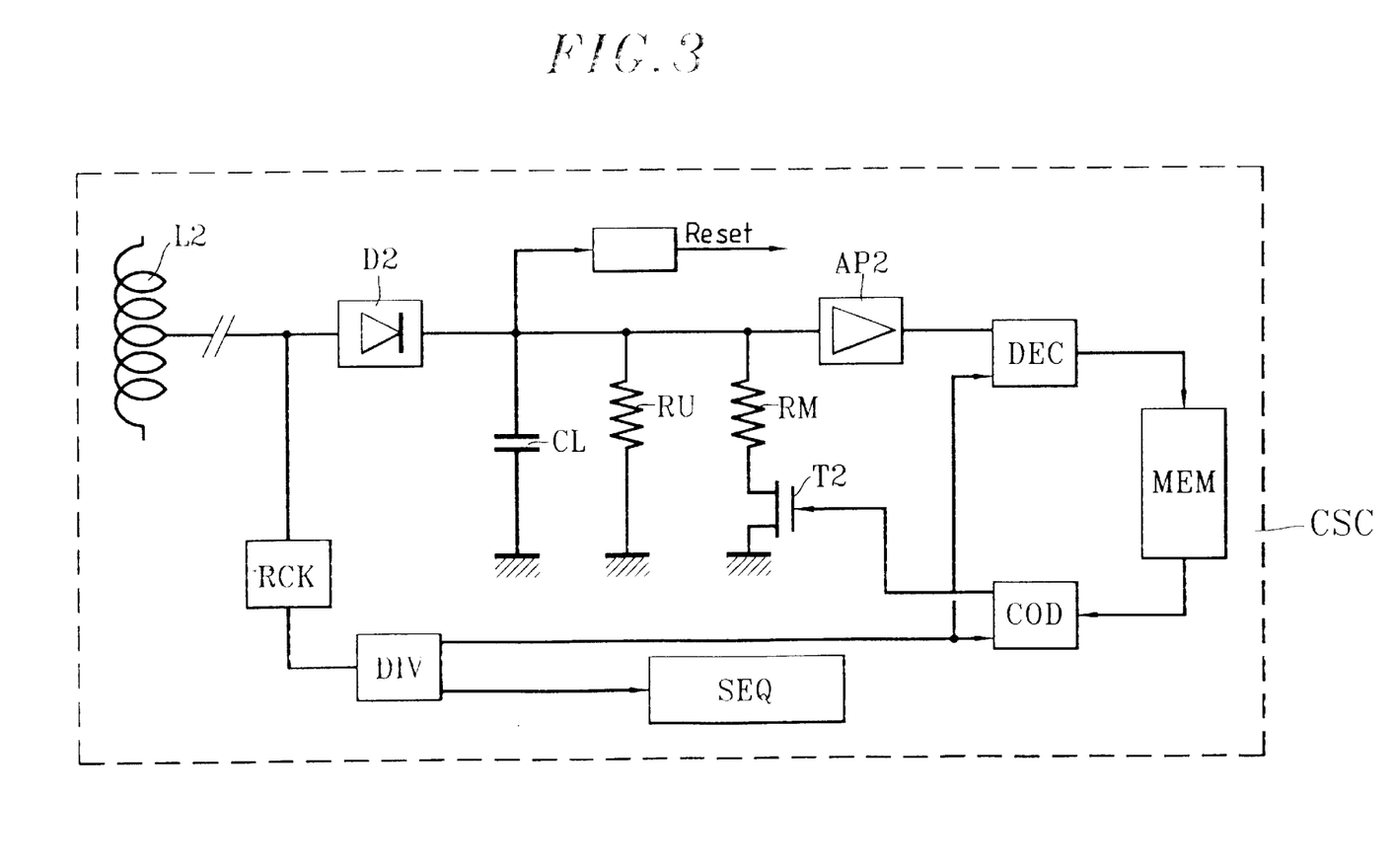
FIG. 3 is an equivalent diagram of part of the essential means of the component according to the invention.

With reference to FIG. 3, clock recovery means RCK are arranged at the output of inductor L2 to regenerate the alternating sine-wave voltage present at the terminals of inductor L2. Means RCK then generate a logic signal of frequency 4.9152 MHz.

Divider means DIV are linked to the clock recovery means RCK to divide the logic signal to an appropriate frequency. For example, the divider means divide the frequency thus recovered by 32 to obtain a frequency of 153.6 kHz intended for timing a sequencer SEQ.

The divider means DIV also divide the logic signal thus recovered by 512 to obtain a frequency of 9600 Hz intended for timing coding means COD and decoding means DEC, described in more detail below.

The transmission of data from the station to the component is based on the amplitude modulation of the signal. At the component, demodulation takes place by the rectifier bridge D2 and the assembly consisting of the load resistor RU and the smoothing capacitor CL.

Advantageously, after elimination of the continuous component, the amplitude demodulated signal, for example 0.3 V with a demodulation level of 10% and a supply voltage of 3 V, is amplified by amplifier means AP2 so as to generate a signal at logic levels. These amplifier means AP2 also eliminate the continuous component of the signal equal to V2 before amplification so as to amplify only the signal, advantageously coded in the Manchester manner.

The information coding is preferably of the Manchester type, i.e. logic state 0 is coded in line by the succession of two binary elements, 1 followed by 0, whereas logic state 1 is coded by the doublet 01. The binary flow is thus twice as high as the flow of information. This information coding has the advantage of improving data transmission by the elimination of the continuous component.

The binary data are stored in the MEM registers. The data transmitted by the station are decoded by the Manchester decoding means DEC before storage. Conversely, the data to be transmitted to the station are coded via coding means COD before being sent via transistor T2. A reset function is also available for correct initialization of the component logic elements.

Figure 4:
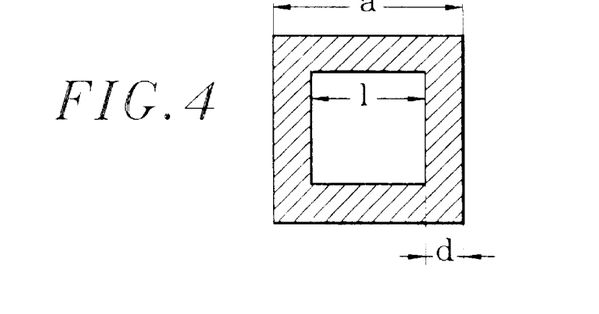
FIG. 4 is a top view of an integrated circuit according to the invention comprising the turns of a flat self-inductor printed or produced by photolithography.
Figure 5:
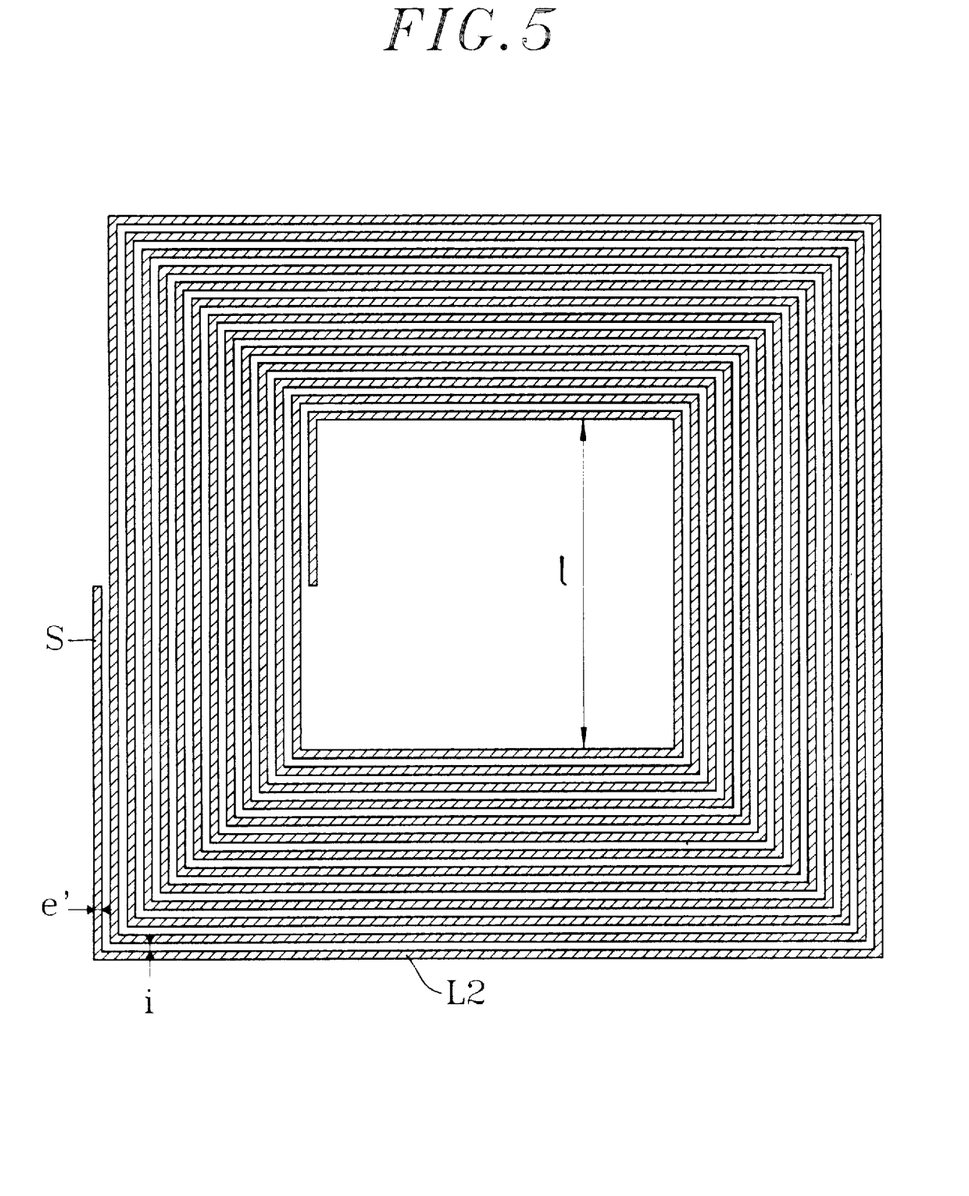
FIG. 5 is a diagrammatic view of the outline of the turns of the integrated circuit in FIG. 4.

With reference to FIGS. 4 and 5, the self-inductor L2 is produced by metallisation on the periphery of the component substantially unoccupied by the processing means and around said processing means for effecting the bidirectional transfer of data. This inductor constitutes a magnetic dipole formed from several turns juxtaposed and wound in accordance with the outline shown in FIG. 5. The turns are not contiguous. Distance i between two adjacent turns is called insulation. The pitch of the turns e is equal to the sum of the insulation i and the width of a turn e'. For example pitch e is equal to 8 $\mu$m with e'=6 $\mu$m and i=2 $\mu$m. The number of turns and their width are defined according to several criteria. One of the main criteria is the yield of the remote supply. Another corresponds to the surface area available on the component and the variation in voltage during data transfer.

First, the yield of the remote supply must allow the generation of an inductive voltage V2 with a value sufficient to supply the logic elements of the component.

Second, the variation in voltage $\Delta$V2 on modulation of the load (i.e. on transmission of data from the component to the station or vice versa) must be small so as not to disrupt the function of the logic circuits of the component.

Third, the surface area S available for engraving the turns of inductor L2 on the component must be sufficiently large to generate the selected inductive voltage V2 and sufficiently small to reduce the production costs of the component.

Figure 7:
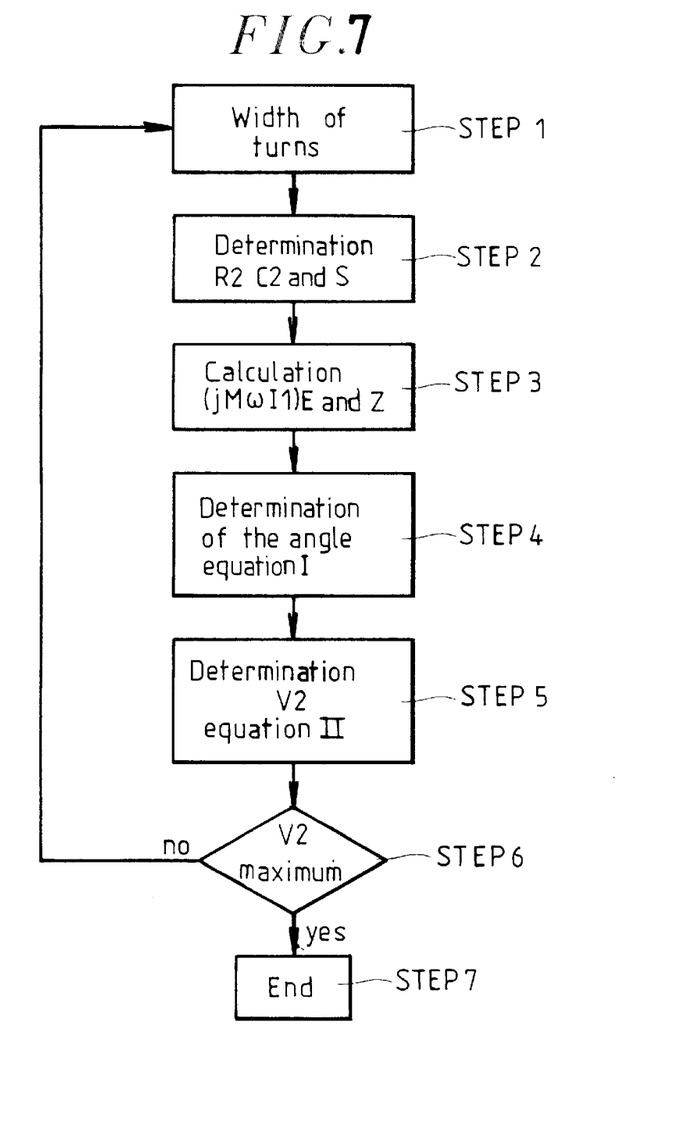
FIG. 7 is a flowchart illustrating the choice of width of the turns of the integrated circuit and their number according to the invention.

The choice of these parameters is optimized in the process described by reference to FIG. 7.

First the physical parameters of the component are selected, i.e. its surface area and the number of metallisation levels for the turns. For example the component has a surface area of 8 mm$^2$, in square form, with a=2.83 mm, l=1.7 mm and d=0.565 mm. The number of metallisations here is equal to 1.

Then the width of the turns is varied according to a loop to obtain an optimum voltage V2, i.e. the highest possible, and an optimum variation $\Delta$V2, i.e. the smallest possible (step 1).

To do this, the value of parameters R2, C2 and S are first determined (step 2).

Resistance R2 is given by equation I in the Annex.

Surface area S is given by equation II in the Annex.

From R and S the value $(jMWI1)_{peak}$ is calculated, which is proportional to the sum of the surface areas of the turns (step 3).

The value of capacitance C2 must then be determined, for example by the use of electrical simulation software. Knowledge of C2 allows calculation of the values of E (equation III in the Annex) and Z (equation IV in the Annex) (step 3).

These two values E and Z are then transferred to equation V in the Annex (step 4).

Finally, knowledge of angle θ1 (the conduction angle of the rectifier D2) allows calculation of voltage V2 according to equation VI in the Annex.

This process is carried out for the various turn widths in order to determine the maximum value of V2.

In a first embodiment in which the component is square in shape with a surface area equal to 8 mm², or the length a equal to 2.93 mm and the internal width l equal to 1.7 mm with a total width d of the turns of the order of 0.565 mm, the coil and the self-inductor occupy an area approximately equal to 60% of the total surface of the component. In the case in the Figure, the coil is produced on one level of metallisation only.

It has been observed that the optimum values correspond to a component with a voltage V2 equal to 2.7 V, an angle θ1 equal to 52.4°, a surface area S equal to 367 mm², a resistance R2 equal to 3.46 kΩ, a number of turns n equal to 69, a width e' equal to 6 μm and an inductance equal to 5.6 Gauss.

In another embodiment (FIG. 6), the applicants have produced the turns of the self-inductor on three levels of metallisation according to 0.5 μm technology. The component has a square surface of 4 mm². Under these conditions, the self-inductor occupies an area equal to 3.5 mm² which corresponds to occupation of the order of 87% of the total surface area of the component.

Figure 6:
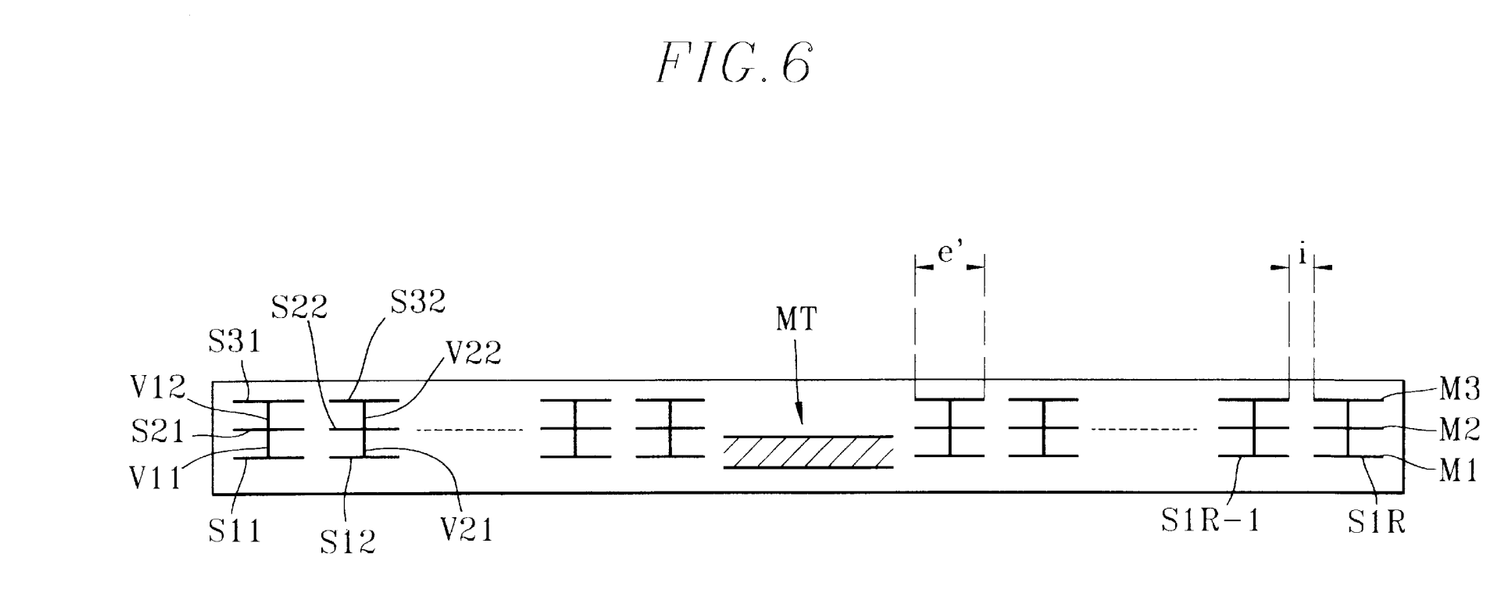
FIG. 6 is a cross sectional view of the component with three levels of metallisation according to the invention.

On FIG. 6, the metallisation layers are identified as M1 to M3, and the turns are identified as Smj with m being an integer number varying from 1 to 3, j being an integer number varying from 1 to R and m×j=n. In the presence of several levels of metallisation, the turns are superimposed over each other with a space of a determined thickness between them.

On each level, the turns are wound substantially in accordance with the outline described with reference to FIG. 5.

The turns of level M1 can be connected in series to those of level M2, and the latter can be connected to the turns of level M3.

However when mounted in series, the capacitance between the turns reduces very significantly the yield of the remote supply.

According to the invention, with reference to FIG. 6, the turns are advantageously short-circuited together. Parallel winding of the turns here reduces the value of the antenna capacitance. In fact the capacitance between the turns is cancelled and only the capacitance between the turns of level M1 and the substrate remains. This reduction gives a clear increase in the remote supply yield.

For example, the short-circuits between turns are produced by metallised paths V identified for example as V11 for the path arranged between the first turn of level M1, identified as S11, and the first turn of level M2, identified as S21.

Annex $$R2 = \left[ 4n\frac{1}{e} + 4n(n+1)\frac{e}{e'} \right] \times R_{square} \quad (I)$$

with
n=number of turns
e'=width of turns
e=pitch of turns e'+i
$R_{square}$=square resistance of metallisation
l=length of side of inner turn in square form $$S = nl^2 + 2le \times n(n+1) + \frac{4e^2}{6} \times n(n+1)(2n+1) \quad (II)$$

$$E = (jM\omega I1)_{peak}\left(\frac{1}{1+jR2C2\omega}\right) \quad (III)$$

$$|Z| = \frac{R2}{\sqrt{[1+(R2C2\omega)^2]}} \quad (IV)$$

$$-Vp = |E|_{peak} \times \left[ 2\sin\theta 1 \times \frac{RU}{\pi|Z|} - \cos\theta 1 \left(2\theta 1 \times \frac{RU}{\pi|Z|} + 1\right) \right] \quad (V)$$

$$V2 = |E| \times \cos\theta 1 - Vp \quad (VI)$$

We claim:

1. A micro-electronic component for a passive card without contact intended to be electromagnetically coupled to a remote station for the bidirectional transfer of data between the card and the station, said component comprising:

a surface on a substrate of the component, said surface having a total surface area;

processing means produced in integrated circuit technology on said surface of the component for processing a signal representative of transferred data, said processing means occupying a surface area substantially smaller than said total surface area;

a coil for supplying a supply voltage to the processing means by induction and for inductive transfer with the station of said signal representative of data, the turns of said coil being produced in flat integrated technology by metallisation and engraved directly on said surface of the component in an area substantially unoccupied by the processing means;

wherein the turns of the coil cover at least about 50% of said total surface area of the component; and wherein the number of turns of the coil and the width of the turns are selected based, at least in part, on the yield of the supply voltage by induction, the total surface area of the component, the surface area occupied by the processing means, and the variation in voltage at terminals of the processing means during the bidirectional transfer of data.

2. A component according to claim 1, wherein the total surface area of the component is 8 mm², the turns of said coil are produced on at least one level of metallisation and the turns of said coil cover approximately 60% of the total surface area of the component.

3. A component according to claim 1, wherein the total surface area of the component is 4 mm², the turns of said coil are produced on three levels of metallisation, and the turns of said coil cover approximately 87% of the total surface area of the component.

4. A component according to claim 1, wherein the turns of said coil are engraved on a periphery of said surface of the component around said processing means.

5. A component according to claim 1, wherein said signal representative of transferred data comprises a high frequency alternating signal transferred by induction from said station to said card and wherein said processing means comprise:

means for rectifying said high frequency alternating signal to produce a continuous signal modulated as a function of data transmitted by the station; and means for demodulation of said continuous signal to recover the data transmitted by the station.

6. A component according to claim 5, wherein said demodulation means are of the amplitude demodulation type.

7. A component according to claim 1, wherein said processing means comprise means for transmitting data from the card to the station, said data transmitting means including means for modulation of a high frequency alternating signal at terminals of the coil.

8. A component according to claim 7, wherein said modulation means are of the amplitude modulation type, said modulation means operating by modulation of a load on the supply voltage.

9. A component according to claim 1, wherein said signal representative of transferred data comprises a high frequency alternating signal transferred by induction from said station to said card and wherein said processing means comprise:

means for recovering a clock signal from said high frequency alternating signal;

means for storage of data, said data storage means being timed according to said clock signal; and means for reading data from said data storage means and writing data to said storage means, said reading/writing means being timed according to said clock signal.

10. A component according to claim 3, wherein the turns of said coil are superposed over each other with a predetermined space between each of said levels, each turn being short-circuited with a turn of an adjacent level.

11. A passive card without contact intended to be electromagnetically coupled to a remote station for the bidirectional transfer of data between the card and said station, said passive card including a component comprising:

a surface on a substrate of the component, said surface having a total surface area;

processing means produced in integrated circuit technology on said surface of the component for processing a signal representative of transferred data, said processing means occupying a surface area substantially smaller than said total surface area;

a coil for supplying power to the processing means by induction and for inductive transfer with the station of said signal representative of data, the turns of said coil being produced in flat integrated technology by metallisation and engraved directly on said surface of the component in an area substantially unoccupied by the processing means;

wherein the turns of the coil cover at least about 50% of said total surface area of the component; and wherein the number of turns of the coil and the width of the turns are selected based, at least in part, on the yield of the power supplied by induction, the total surface area of the component, the surface area occupied by the processing means, and the variation in voltage at terminals of the processing means during the bidirectional transfer of data.

12. A passive card according to claim 11 wherein said remote station comprises:

a solenoid electromagnetically coupled with said passive card;

an oscillator producing a high frequency signal;

a first amplifier receiving said high frequency signal from said oscillator and supplying an amplified high frequency signal to said solenoid;

an attentuator-phase shifter network receiving said data from said solenoid;

a mixer receiving an output from said attentuator-phase shifter network and from said oscillator;

a second amplifier receiving input from said mixer; and means for regenerating binary data from an output of said second amplifier.

13. A process for producing a micro-electronic component for a passive card without contact intended to be electromagnetically coupled to a remote station for the bidirectional transfer of data between the card and the station, said process comprising the steps of:

(a) selecting a number of turns of a coil and a width of said turns based on the yield of the supply by induction, the total surface area of the component, the surface area occupied by a processing means, and the variation in voltage at terminals of the processing means during the bidirectional transfer of data.

(b) producing processing means for processing a signal representative of transferred data in integrated circuit technology on a surface on a substrate of the component, said surface having a total surface area of a few square millimeters, said processing means occupying a surface area substantially smaller than said total surface area; and (c) producing in flat integrated technology, by metallisation and direct engraving on said surface of the component in an area substantially unoccupied by the processing means, the coil for supplying the processing means by induction and for inductive transfer with the station of said signal representative of data, wherein the turns of the coil are produced to cover at least about 50% of said total surface area of the component.

14. A process according to claim 13, wherein the turns of said coil are produced on at least one metallisation level.

15. A process according to claim 13, wherein the turns of said coil are produced on three levels of metallisation using a technology of 0.5 $\mu$m.

* * * * *